US008059097B2

(12) United States Patent
Duarte et al.

(10) Patent No.: US 8,059,097 B2
(45) Date of Patent: Nov. 15, 2011

(54) SHARED SYMBOL AND EMOTICON KEY AND METHODS

(75) Inventors: Matias Duarte, Los Angeles, CA (US); Jeremy D. Rossen, Los Angeles, CA (US); Wesley Yan, Los Angeles, CA (US); Sang Kyun Kim, Sungnam (KR)

(73) Assignee: Virgin Mobile USA LP, Warren, NJ (US)

( * ) Notice: Subject to any disclaimer, the term of this patent is extended or adjusted under 35 U.S.C. 154(b) by 791 days.

(21) Appl. No.: 11/796,359

(22) Filed: Apr. 27, 2007

(65) Prior Publication Data

US 2008/0266262 A1  Oct. 30, 2008

(51) Int. Cl.
*G09G 5/00* (2006.01)
(52) U.S. Cl. ......... 345/169; 345/168; 345/629; 345/156
(58) Field of Classification Search .................. 345/168, 345/169, 173, 158, 690, 156, 629; 715/535, 715/834, 764, 744, 205, 845, 810, 758; 455/466, 455/550.1, 566, 575.1, 556.2, 412.1; 341/128, 341/176; 400/486
See application file for complete search history.

(56) References Cited

U.S. PATENT DOCUMENTS

| | | | |
|---|---|---|---|
| 4,555,193 A * | 11/1985 | Stone ........................... 400/486 |
| 6,594,616 B2 | 7/2003 | Zhang et al. |
| 6,629,793 B1 | 10/2003 | Miller |
| 6,636,162 B1 * | 10/2003 | Kushler et al. .................. 341/28 |
| 6,975,304 B1 * | 12/2005 | Hawkins et al. .............. 345/168 |
| 7,016,704 B2 | 3/2006 | Pallakoff |
| 7,030,863 B2 | 4/2006 | Longe et al. |
| 7,075,520 B2 * | 7/2006 | Williams ....................... 345/169 |
| 7,127,679 B2 * | 10/2006 | Cohen ........................... 715/744 |
| 7,167,731 B2 | 1/2007 | Nelson |
| 7,440,746 B1 * | 10/2008 | Swan .......................... 455/412.1 |
| 7,750,891 B2 * | 7/2010 | Stephanick et al. .......... 345/173 |
| 7,873,911 B2 * | 1/2011 | Gopalakrishnan ............ 715/764 |
| 7,889,112 B1 * | 2/2011 | Vergis et al. ................... 341/176 |
| 7,961,903 B2 * | 6/2011 | Lim ............................... 382/100 |
| 2003/0004983 A1 * | 1/2003 | Cohen ........................... 707/500 |
| 2005/0122344 A1 * | 6/2005 | Theimer et al. ............... 345/629 |
| 2005/0179654 A1 * | 8/2005 | Hawkins et al. .............. 345/156 |
| 2005/0248527 A1 | 11/2005 | Scott |
| 2006/0009243 A1 * | 1/2006 | Dahan et al. .................. 455/466 |
| 2006/0015812 A1 * | 1/2006 | Cunningham et al. ........ 715/535 |
| 2006/0047704 A1 * | 3/2006 | Gopalakrishnan ......... 707/104.1 |
| 2006/0119582 A1 | 6/2006 | Ng et al. |
| 2006/0223502 A1 | 10/2006 | Doulton |
| 2006/0268007 A1 * | 11/2006 | Gopalakrishnan ............ 345/619 |
| 2006/0274051 A1 * | 12/2006 | Longe et al. .................. 345/173 |
| 2007/0035523 A1 * | 2/2007 | Cohen ........................... 345/169 |
| 2007/0192713 A1 * | 8/2007 | Lee et al. ....................... 715/764 |
| 2007/0200828 A1 * | 8/2007 | Skillman et al. .............. 345/169 |
| 2009/0083665 A1 * | 3/2009 | Anttila et al. ................. 715/834 |
| 2010/0188338 A1 * | 7/2010 | Longe ........................... 345/168 |

OTHER PUBLICATIONS

EmoMail, www.maxplugs.com, copyright 2002-2003 MaxPlugs, p. 1-3 http://www.maxplugs.com/emomail/.

* cited by examiner

*Primary Examiner* — Prabodh Dharia

(57) ABSTRACT

The present invention provides systems and methods for using a dedicated shared emoticon and symbol key on a keypad of a mobile electronic device. The shared key is adapted to access a menu of multiple symbols and emoticons using a toggle input and can be accessed with minimal user input and minimal user manipulation and displayed to a user or message recipient.

17 Claims, 5 Drawing Sheets

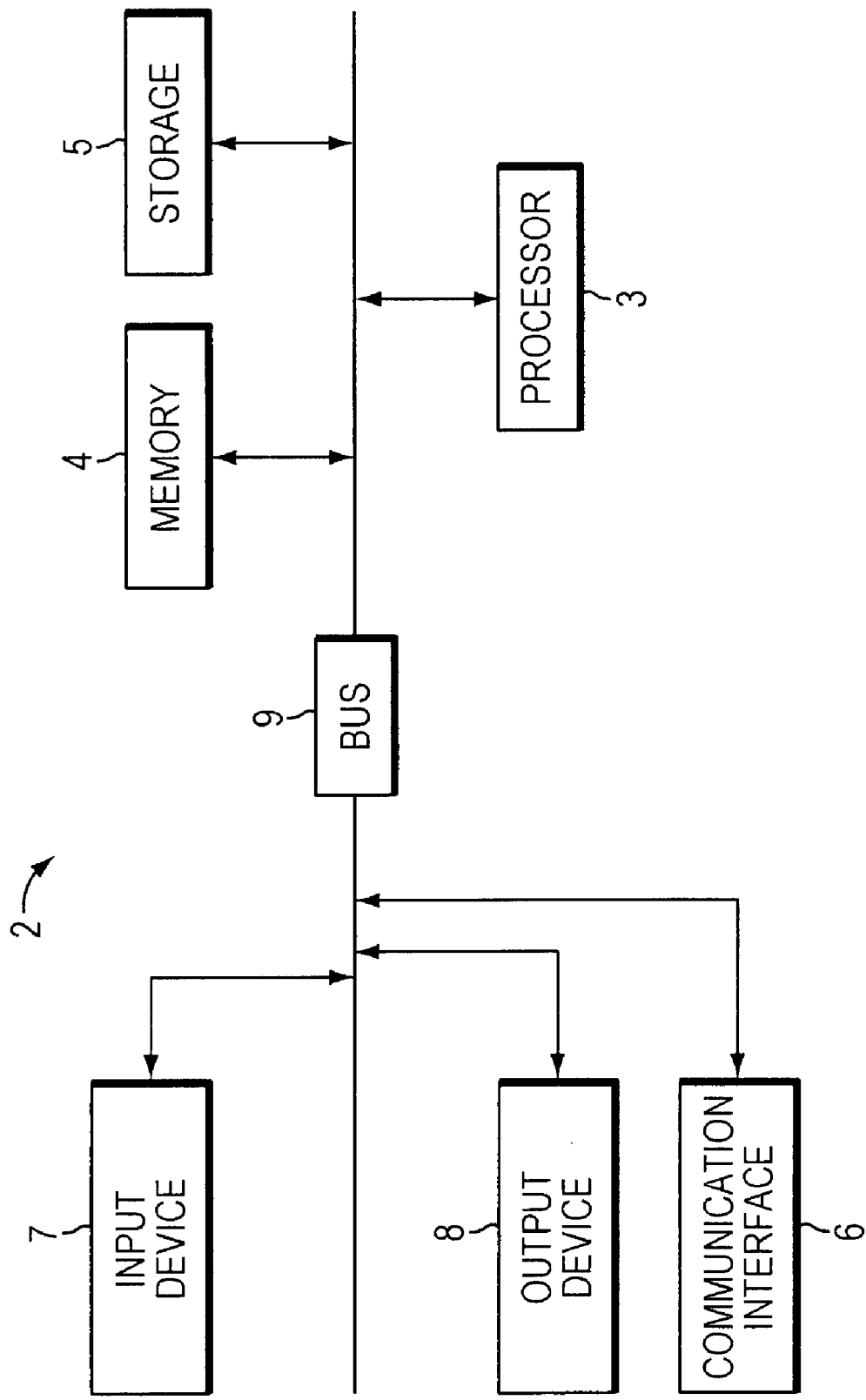

FIG. 3A

SHARED SYMBOL AND EMOTICON KEY AND METHODS

FIELD OF THE INVENTION

The present invention relates generally to user interfaces for mobile electronic communications and, more particularly, to a system and method for entering symbols and emoticons on a mobile device.

BACKGROUND OF THE INVENTION

As mobile electronic communications have proliferated, their importance has greatly increased. The need for inserting symbols and emoticons in electronic communications, such as emails, text messages and other mobile communications, has also greatly increased. However, the method of entering emoticons such as the "smiley face" or the "sad face" in such communications has not significantly changed. In particular, users often have to input emoticons by entering a series of textual symbols on an alphanumeric keypad or by sequentially accessing a series of menus associated with the type of symbols or emoticons. A user input method of this type may be adequate for users of desktop computers, but not for mobile users who desire to access emoticons and symbols with minimal input. Therefore, a need exists for more access solutions that are fast, intuitive, and easy to use.

SUMMARY OF THE INVENTION

Embodiments of the present invention provide systems and methods for entering information such as symbols and emoticons using a mobile device. In more specific terms, embodiments of the present invention provide systems and methods for accessing a menu of multiple symbols and emoticons using a dedicated shared emoticon and symbol key on a keypad of a mobile electronic device. The shared key utilizes a toggle input in lieu of a shift or alt key based approach such that emoticons and symbols can be accessed with minimal user input and minimal user manipulation.

In one aspect, the invention relates to a mobile device having a display, a processor, and a keypad with a shared key that has a first identifier and a second identifier. When the shared key is actuated the first time, the processor is programmed to display a first menu associated with the first identifier on the display. When the shared key is actuated a second time, the processor is programmed to display a second menu associated with the second identifier on the display. Further, the processor is programmed such that actuating the shared key when the first menu is being displayed causes the second menu to be displayed. Similarly, the processor is programmed such that actuating the shared key when the second menu is being displayed causes the first menu to be displayed. In one embodiment, the first and second identifiers can be an emoticon, a symbol, a smiley or an alphanumeric character.

Another aspect of the invention relates to a method for selecting a symbol or emoticon to be displayed on a mobile device including actuating a key on a keypad on the mobile device, in which the key has a first identifier and a second identifier. A first menu is associated with the first identifier and a second menu is associated with the second identifier. The method further includes displaying a first menu associated with the first identifier on the display screen when the key is actuated a first time in response to actuating the key; actuating the key when the first menu is being displayed; and in response to actuating the key when the first menu is being displayed, displaying a second menu associated with the second identifier on the display screen. The method may further include actuating the key when the first menu is being displayed such that it causes the second menu to be displayed. The method may also further include actuating the key when the second menu is being displayed such that it causes the first menu to be displayed. In one embodiment, the first and second identifiers can be an emoticon, a symbol, a smiley or an alphanumeric character.

Yet another aspect of the invention relates to a method for selecting a symbol or emoticon to be displayed on a mobile device including displaying a first menu to a user in response to a first actuation of a shared key, in which the first menu comprises a first plurality of menu elements; displaying a second menu to the user in response to a second actuation of a shared key, in which the second menu comprises a second plurality of menu elements; and controlling the display of the first menu and the second menu such that a subsequent actuation of the shared key toggles between the first menu and second menu. In one embodiment, the second actuation of the shared key is subsequent to and not simultaneous with the actuation of the first key. In one embodiment, the first and second identifiers can be an emoticon, a symbol, a smiley or an alphanumeric character.

BRIEF DESCRIPTION OF THE DRAWINGS

These embodiments and other aspects of this invention will be readily apparent from the detailed description below and the appended drawings, which are meant to illustrate and not to limit the invention, and in which:

FIG. 1A is a functional block diagram that illustrates the components of an exemplary system for practicing an embodiment of the present invention;

FIGS. 3A and 3B are schematic diagrams that illustrate exemplary symbol and emoticon menus respectively according to an embodiment of the present invention.

DETAILED DESCRIPTION OF THE PREFERRED EMBODIMENTS

Figure 1B:
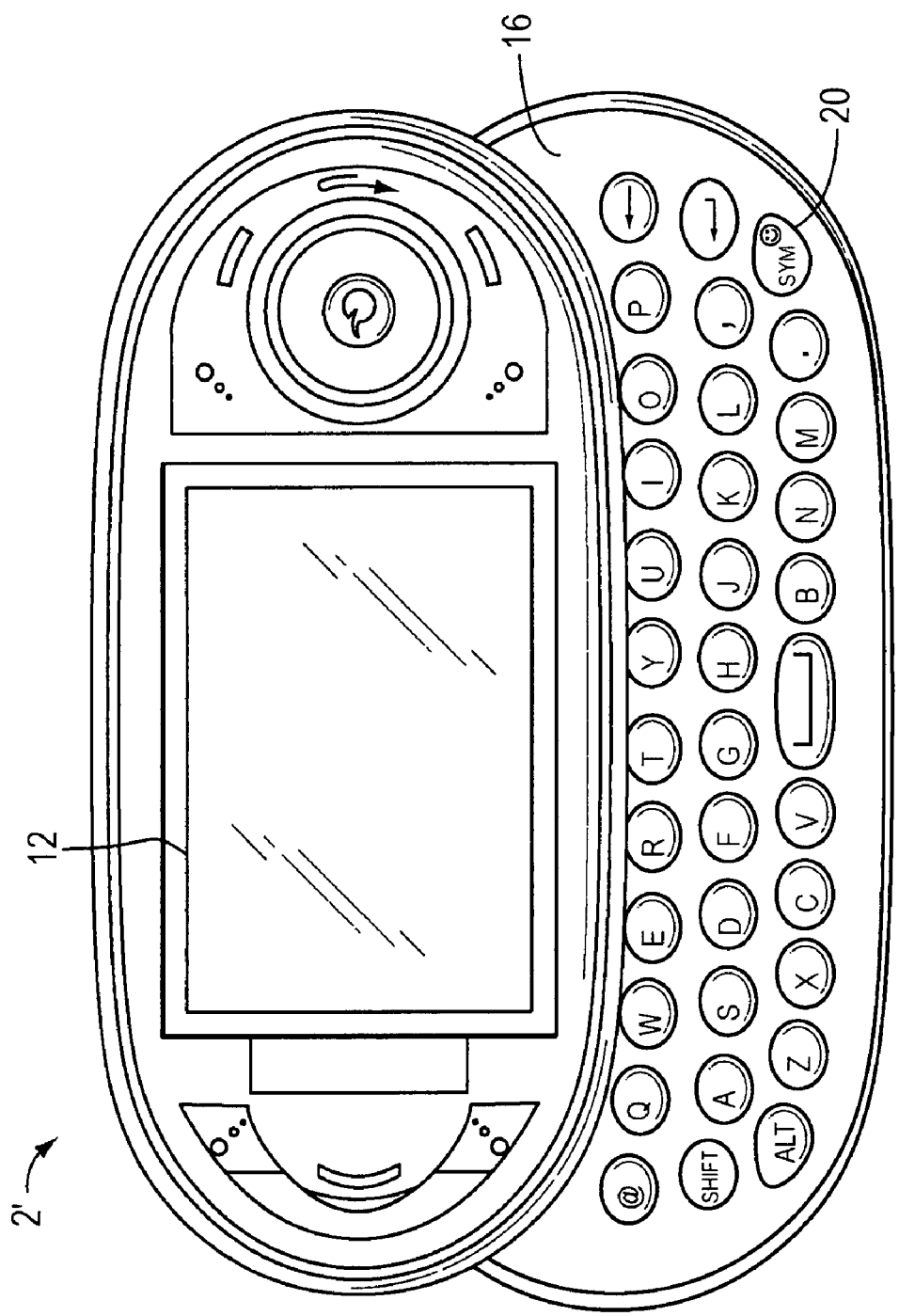
FIG. 1B is a schematic diagram that illustrates a mobile device according to an embodiment of the present invention.

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

In the following discussion of illustrative embodiments, a "mobile device" includes, without limitation, mobile phones, personal digital assistants, hand-held computers, ultra-mobile personal computers, and the like. The term "informational object" refers to information, in any form, than can be processed on the mobile device including, but not limited to, email, pictures, and text messages.

Embodiments of the present invention relate to a systems and methods for entering informational objects such as symbols and emoticons into a mobile device. In more specific terms, embodiments of the present invention provide systems and methods for using a dedicated shared emoticon and symbol key on a keypad of a mobile electronic device. According to such an embodiment, the shared key is adapted to access a menu of multiple symbols and emoticons using a toggle input in lieu of a shift or alt key based approach such that emoticons and symbols can be accessed with minimal user input and reduced user manipulation. In an embodiment, the shared key is located on the keypad of the mobile device in any convenient position as suitable for a particular mobile device.

FIG. 1A is a functional block diagram that illustrates the components of an exemplary mobile device for practicing an embodiment of the present invention. Mobile device preferably includes a processing unit or processor 3, a system memory 4, a disk storage 5, a communication interface 6, an input device 7, an output device 8, and a system bus 9. System bus 9 couples system components including, but not limited to, system memory 4 to processing unit 3. The processing unit 3 can be any of various available processors.

Input device 7 may be a keyboard, thumbboard, or touchscreen (for use with a stylus) that are used to receive data from a user. In addition, input device 7 can also include a plurality of other inputs or controls for adjusting and configuring one or more aspects of the present invention including voice commands. Output device 8 may be a display device, such as an LCD or LED display screen, that can display one or more display objects (not shown) such as configurable icons, buttons, input boxes, menus, tabs, key labels and so forth having multiple configurable dimensions, shapes, colors, text, data and sounds to facilitate operations with mobile device 2.

Communication interface 6 facilitates data exchange over a variety of wireless networks. The hardware and software necessary for connection to the communication interface 6 includes, for exemplary purposes only, internal and external components that transmit and receive data wirelessly using a plurality of standard protocols including, for example, PCS, GSM, CDMA, Bluetooth, WiFi, IrDA, WiMAX, WiBRO or through other known wireless standards.

Storage 5 may include removable or fixed, volatile or nonvolatile or permanent or re-writable computer storage media. The computer readable medium can be any available medium that can be accessed by a general purpose or special purpose mobile device. By way of example, and not limitation, such a computer readable medium can comprise flash memory, RAM, ROM, electrically erasable programmable read only memory (EEPROM), optical disk storage, magnetic disk storage or other magnetic storage devices, or any other medium that can be used to store digital information on a mobile device.

It is to be appreciated that FIG. 1A describes software that acts as an intermediary between users and the basic resources described in mobile device 2. Such software preferably includes an operating system. The operating system, which can be resident in storage 5, acts to control and allocate resources of mobile device 2. System applications take advantage of the management of resources by the operating system through program modules and program data stored either in system memory 4 or on disk storage 5. Furthermore, it is to be appreciated that the present invention can be implemented with various operating systems or combinations of operating systems.

The computer readable medium tangibly embodies a program, functions, and/or instructions that cause the computer system to operate in a specific and predefined manner as described herein. Those skilled in the art will appreciate, however, that the process described below, such as the process illustrated in FIG. 2, may be implemented at any level, ranging from hardware to application software and in any appropriate physical location. For example, the present invention may be implemented as software code to be executed by mobile device using any suitable computer language and may be stored on any of the storage media described above, or can be configured into the logic of mobile device 2. Such software code may be executed by mobile device using any suitable computer language such as, for example, Java, Javascript, C++, C, C#, Perl, Visual Basic, Transact/Structure Query Language (T/SQL), database languages, APIs, various system-level SDKs, assembly, firmware, microcode, and/or other languages and tools.

These are representative components of a mobile device whose operation is well understood. Furthermore, those of ordinary skill in the art will appreciate that mobile device 2 of FIG. 1A is exemplary only and that the present invention can operate within a number of different mobile devices.

FIG. 1B illustrates the components of an exemplary mobile device for practicing an embodiment of the present invention. In the illustrated embodiment, the mobile device 2' preferably includes a display 12, a processor 14, and a keypad 16. The input device 7 is a keypad 16, which includes a dedicated shared emoticon and symbol key 20 adapted to access a first menu of symbols and a second menu of emoticons using a toggle input in lieu of a SHIFT or ALT key based approach. In one embodiment, as illustrated in FIG. 1B, the dedicated shared emoticon and symbol key 20 is a key with the first identifier and a second identifier. The shared key's labels 20 can serve as first and second identifiers.

Figure 2:
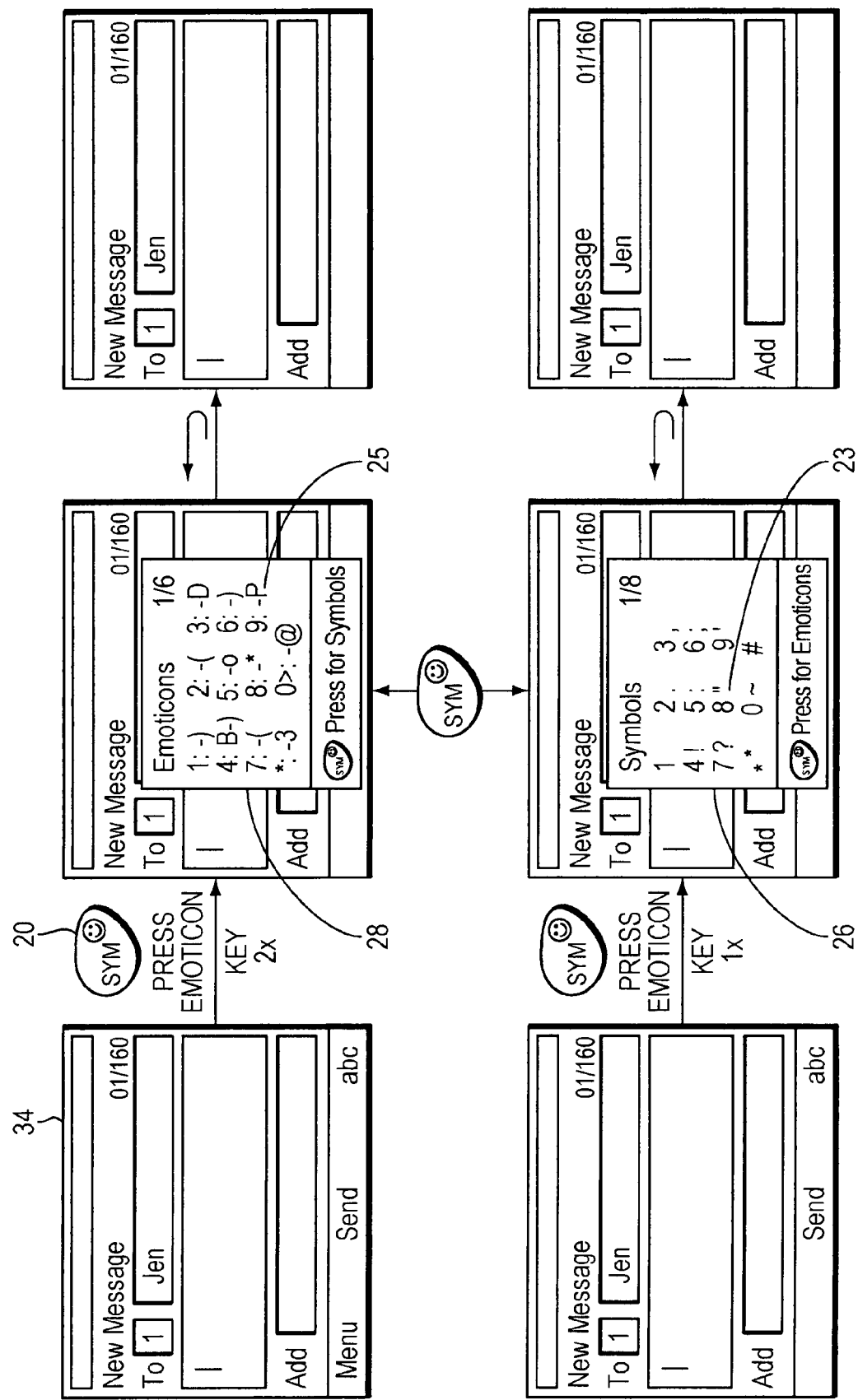
FIG. 2 is a schematic diagram that illustrates an exemplary method involved in practicing an embodiment of the present invention.

FIG. 2 is schematic diagram that illustrates a method using the mobile device for quickly entering symbols 23 and emoticons 25 into an informational object such as a text message or email 34 according to an embodiment of the present invention. Mobile device includes a first identifier "SYM" and the smiley face image (second identifier) shown on the shared key 20, such that the function and action associated with the shared key 20 may be readily defined and re-defined according to the particular state of the user interface. However, any label or identifier can be used in some embodiments.

In the illustrated embodiment, the state of the user interface is "idle." When pressed or otherwise actuated, the shared key 20 causes mobile device to display a first or second menu 26 or 28 associated with the first or second identifiers in a prescribed manner. The request for accessing the menus 26 or 28 of symbols 23 or emoticons 25 may be processed as a signal or signals sent to the processor 3 corresponding to the number of times the shared key 20 was actuated. According to an embodiment, the mobile device is configured to respond to the number of times the key 20 was actuated using a predefined scheme, such as by determining the amount of time that lapsed between actuating the key 20 or by tracking the number of shared key actuation times. Thus, the user need only actuate the shared key 20 to display the corresponding menus 26 and 28 in lieu of using an ALT or SHIFT key with a combination of other keystrokes. This is an intuitive approach that saves time and allows easy access between multiple scrollable menus.

In one embodiment, when a user desires to enter a symbol 23 as part of an informational object such as a text message or email, the shared key 20 is actuated once. In response to such an actuation, the processor 14 is programmed to display a first menu 26 associated with the first identifier on the display 12. When the shared key 20 is actuated a second time, the processor 14 is programmed to display a second menu 28 associated with the second identifier on the display 12. The processor 14 is programmed such that actuating the shared key 20 when the first menu 26 is being displayed causes the second menu 28 to be displayed.

Similarly, the processor 14 is programmed such that actuating the shared key 20 when the second menu 28 is being displayed causes the first menu 26 to be displayed. In one embodiment, the first and second identifiers can be a symbol 23, an emoticon 25, a smiley 30 or an alphanumeric character 32. The order of actuating the shared key 20 to call certain menus can be the reverse of that described above. Also the use of shared key as described herein can be extended to other menus, not only symbols and emoticons. Once a menu is displayed, controls such as a dial or arrow keys can be used to scroll through and select a particular menu item, such as an emoticon or symbol.

When a user selects a symbol 23 or emoticon 25 to be included as part of an informational object such as a text message or email, on a mobile device 2, a shared key 20 on a keypad 16 is actuated. In response to actuating the key 20 one time, a menu 26 of symbols 23 is displayed on the screen 12. When the key 20 is actuated a second time while the first menu 26 of symbols 23 is displayed, a second menu 28 of emoticons 25 is displayed. Toggling the shared key 20 causes the menu 26 of symbols and the menu 28 of emoticons to be displayed alternatively.

Yet another illustrative embodiment discloses a method for selecting a symbol or emoticon for display on a mobile device by double-actuating the shared key 20 on the keypad 16 on the mobile device 2, in which, the key 20 is actuated successively a first time and a second time without a long duration of time lapsed in between those two actuations. For example, a user can double-click the shared key 20 on the phone following the same manner as double-clicking a button of a computer mouse on a desktop computer. When the shared key 20 was not previously actuated or no menu is presently displayed on the screen 12, double actuating the key 20 will prompt the processor 14 to display the second menu 28 associated with the second identifier on the screen 12. When the second menu 28 is presently displayed, further single actuation of the key 20 will prompt the first menu 26 associated with the first identifier to be displayed. In this illustrative embodiment, after double-actuating the shared key 20, a menu 28 of emoticons 25 will be displayed. While the menu 28 of emoticons 25 are displayed on the screen 12, actuating the key 20 once will prompt the processor 14 to display the menu 26 of symbols. Actuating the key 20 singly one more time while the first identifier 22 or symbols are displayed, will prompt the processor 14 to display the menu 28 associated with the second identifiers or emoticons.

Figure 3A:
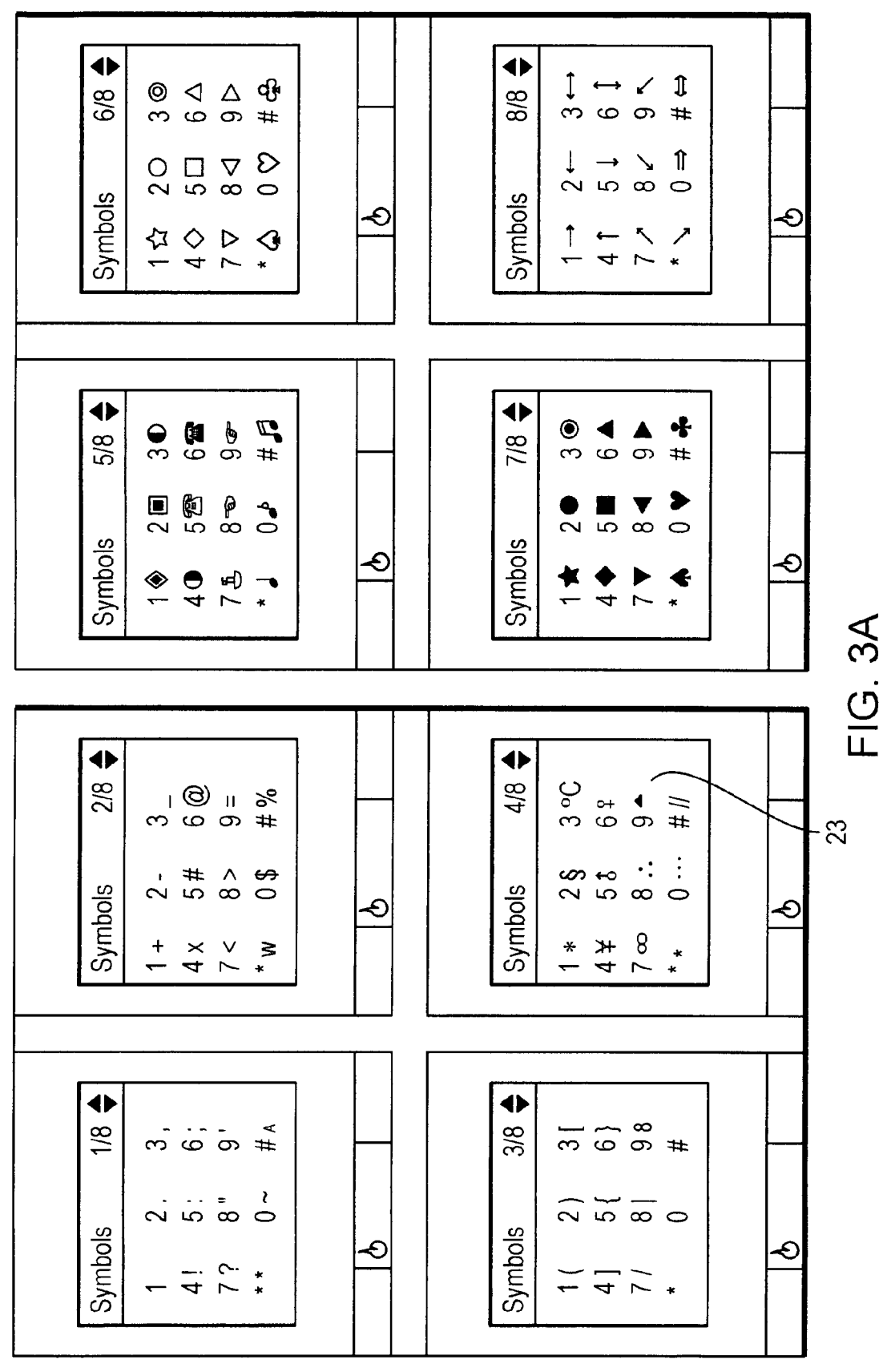
Figure 3B:
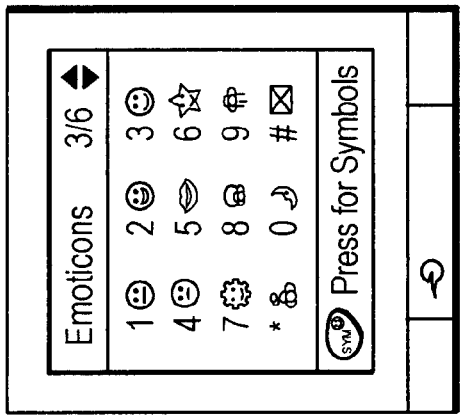
Figure 3B:
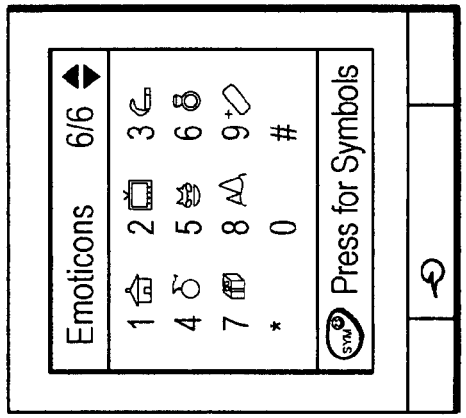
Figure 3B:
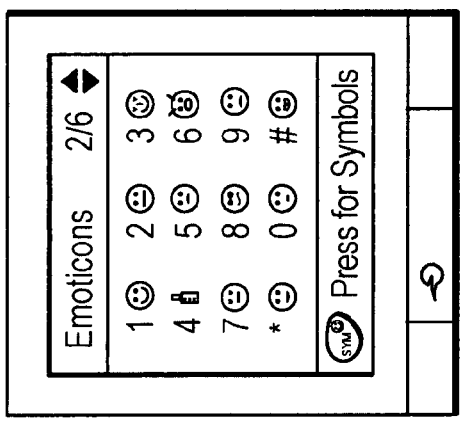
Figure 3B:
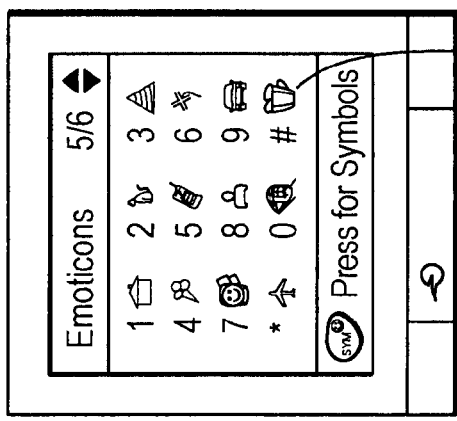
Figure 3B:
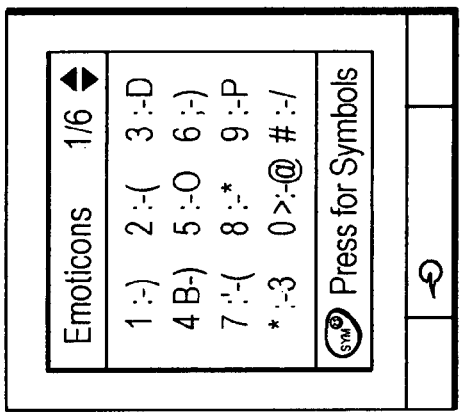
Figure 3B:
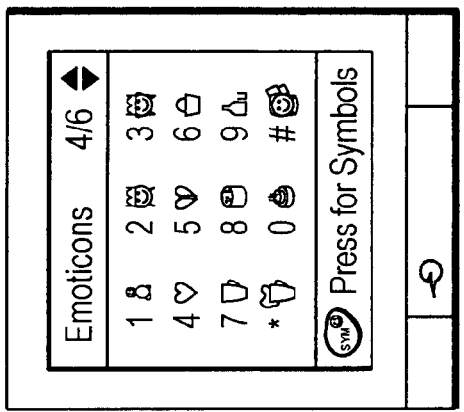

FIGS. 3A and 3B are schematic diagrams that illustrate exemplary display menus 26 and 28 that contain a plurality of menu elements in the form of symbols and emoticons. The menus are capable of displaying successive screens of symbols 23 and emoticons 25 for a user's selection in response to activation of the shared key 20.

It should be appreciated that various aspects of the claimed invention are directed to subsets and substeps of the techniques disclosed herein. Further, the terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. Accordingly, what is desired to be secured by Letters Patent is the invention as defined and differentiated in the following claims, including all equivalents.

What is claimed is:

1. A mobile device, comprising:
a display screen;
a processor running an application; and
a keypad comprising a key visually identified by a first identifier and a second identifier,
wherein the first identifier represents a first object menu including a first plurality of visual objects, and the second identifier represents a second object menu including a second plurality of visual objects, wherein the first menu includes at least one visual object not included in the second menu, the objects included in the first object menu and the second object menu are independent of applications running on the mobile device, the first plurality of visual objects include emoticons, the first identifier comprises an emoticon that visually represents the first plurality of visual objects, and the second identifier visually represents the second plurality of visual objects;
wherein the processor is programmed to display the first object menu on the display screen in response to the key being actuated a first time, to feed a first visual object in the first object menu into the application as a user input for display in response to receiving a user selection of the first visual object,
wherein the processor is further programmed to display the second object menu on the display screen in response to the key being actuated when the first object menu is being displayed, and to feed a second visual object in the second object menu into the application as a user input for display in response to receiving a user selection of the second visual object.

2. The mobile device of claim 1 wherein the processor is further programmed to toggle between the first object menu and the second object menu in response to the key being actuated when one of the first object menu and the second object menu is being displayed.

3. The mobile device of claim 1 wherein the second object menu includes symbols and the second identifier comprises a symbol.

4. The mobile device of claim 3 wherein the first identifier comprises a smiley.

5. The mobile device of claim 3 wherein the second identifier comprises an alphanumeric character.

6. The mobile device of claim 1 wherein the key is determined actuated when an amount of time since the key is being pressed exceeds a predetermined threshold value.

7. A method of selecting a symbol for display on a mobile device, the method comprising the steps of:
in response to a key on a keypad on the mobile device being actuated a first time when an application is running on the mobile device, displaying on a display screen on the mobile device a first object menu including a first plurality of visual objects,
in response to receiving a user selection of a first visual object in the first object menu, feeding the first visual object into the application as a user input for display;
in response to the key being actuated when the first object menu is being displayed, displaying on the display screen a second object menu including a second plurality of visual objects; and
in response to receiving a user selection of a second visual object in the second object menu, feeding the second visual object into the application as a user input for display,
wherein the first menu includes at least one visual object not included in the second menu, the objects included in the first object menu and the second object menu are independent of applications running on the mobile device, the first plurality of visual objects include emoticons, the first identifier comprises an emoticon that visually represents the first plurality of visual objects, and the second identifier visually represents the second plurality of visual objects.

8. The method of claim 7 further comprising:
in response to the key being actuated when one of the first object menu and the second object menu is being displayed, toggling between the first object menu and the second object menu.

9. The mobile device of claim 7 wherein the second object menu includes symbols and the second identifier comprises a symbol.

10. The mobile device of claim 9 wherein the first identifier comprises a smiley.

11. The mobile device of claim 7 wherein the key is determined actuated when an amount of time since the key is being pressed exceeds a predetermined threshold value.

12. The mobile device of claim 9 wherein the second identifier comprises an alphanumeric character.

13. A non-transitory computer-readable storage medium encoded with executable computer program code for selecting a symbol for display on a mobile device, the computer program code comprising program code for:
in response to a key on a keypad on the mobile device being actuated a first time when an application is running on the mobile device, displaying on a display screen on the mobile device a first object menu including a first plurality of visual objects;
in response to receiving a user selection of a first visual object in the first object menu, feeding the first visual object into the application as a user input for display;
in response to the key being actuated when the first object menu is being displayed, displaying on the display screen a second object menu including a second plurality of visual objects; and
in response to receiving a user selection of a second visual object in the second object menu, feeding the second visual object into the application as a user input for display,
wherein the first menu includes at least one visual object not included in the second menu, the objects included in the first object menu and the second object menu are independent of applications running on the mobile device, the first plurality of visual objects include emoticons, the first identifier comprises an emoticon that visually represents the first plurality of visual objects, and the second identifier visually represents the second plurality of visual objects.

14. The non-transitory computer-readable storage medium of claim 13 further comprising:
in response to the key being actuated when one of the first object menu and the second object menu is being displayed, toggling between the first object menu and the second object menu.

15. The non-transitory computer-readable storage medium of claim 13 wherein the second object menu includes symbols and the second identifier comprises a symbol.

16. The non-transitory computer-readable storage medium of claim 15 wherein the first identifier comprises a smiley.

17. The non-transitory computer-readable storage medium of claim 15 wherein the second identifier comprises an alphanumeric character.

* * * * *